United States Patent [19]

Lapointe

[11] 4,159,083
[45] Jun. 26, 1979

[54] DEBRIS SEPARATING CHIPPER

[75] Inventor: Joseph A. Lapointe, Pointe Claire, Canada

[73] Assignee: Domtar Inc., Montreal, Canada

[21] Appl. No.: 855,073

[22] Filed: Nov. 25, 1977

Related U.S. Application Data

[63] Continuation-in-part of Ser. No. 677,317, Apr. 15, 1976, abandoned.

[51] Int. Cl.² ............................................. B02C 18/08
[52] U.S. Cl. ................................ 241/68; 144/162 R; 144/176; 144/323; 241/92
[58] Field of Search ..................... 241/68, 92–93, 241/278 R, 282 J, 282.2; 144/162 R, 176, 208 E, 323

[56] References Cited

U.S. PATENT DOCUMENTS

| | | | |
|---|---|---|---|
| 2,596,015 | 5/1952 | Dunwody | 241/92 X |
| 2,818,897 | 1/1958 | Schachet | 241/282.2 |
| 3,144,995 | 8/1964 | Fontaine | 241/282.2 X |
| 3,536,265 | 10/1970 | Ceruenak | 241/92 X |
| 3,812,891 | 5/1974 | Reuter | 144/176 X |
| 3,842,873 | 10/1974 | Valo | 144/176 X |

OTHER PUBLICATIONS

Pulpwood Production, Mar. 1973, pp. 32-33, Article titled "In-The-Bark".

Primary Examiner—Howard N. Goldberg
Attorney, Agent, or Firm—C. A. Rowley

[57] ABSTRACT

The present invention is related to a chipper wherein the housing is divided by a chipper disc into a front chamber and a chip chamber and wherein separate outlets are provided from the front chamber and from the chip chamber respectively for twigs and the like (debris) and for chips whereby separation of debris from the chips is obtained in the chipper.

10 Claims, 5 Drawing Figures

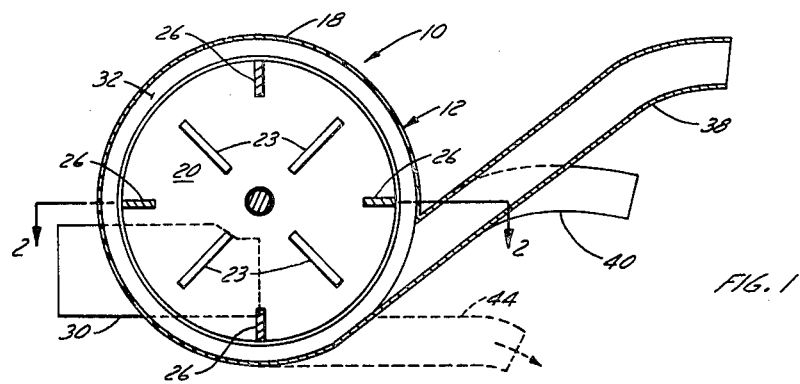
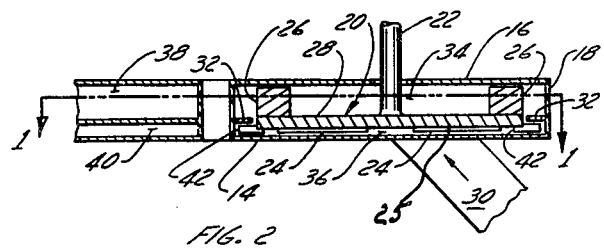
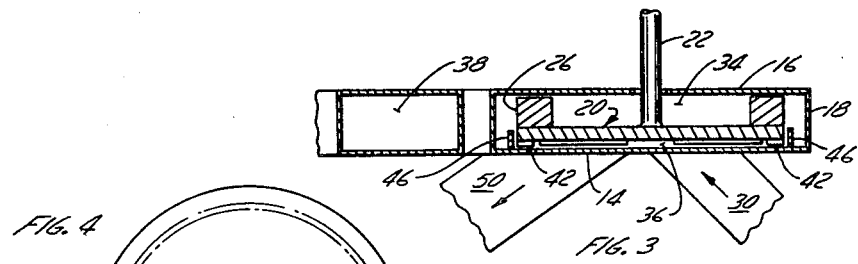
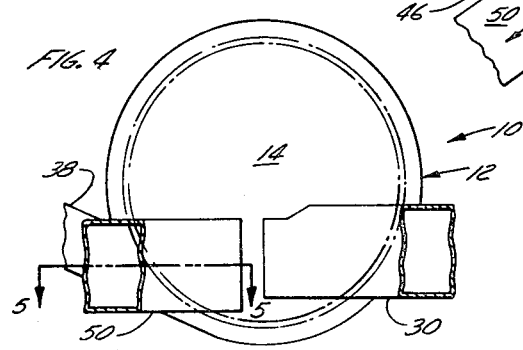
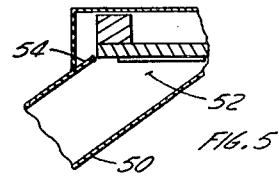

DEBRIS SEPARATING CHIPPER

This application is a continuation-in-part of application Ser. No. 677,317 filed Apr. 15, 1976— now abandoned.

FIELD OF THE INVENTION

The present invention relates to a chipper. More specifically the present invention relates to a chipper for processing whole trees and simultaneously separating debris from the chips.

BACKGROUND OF THE INVENTION

Chips from whole trees or similar material provides an inexpensive source of wood and many pulp mills are now using varying proportions of these chips together with the regular chips. However, chips from whole trees generally contain a significant amount of long twigs or branch stems that cause costly handling problems, for example, hung-ups in chip bins are metering valves etc. and use of these chips is restricted. The industry in the near future may be forced by government regulations to further utilization of the cut tree and whole tree chipping may be more widespread.

Convential disc chippers including those used to chip whole trees include a housing with a disc rotably mounted therein and provided with slots therethrough and knives. The cut chips pass through the slots into a chamber and are ejected from the chamber by suitable vanes projecting from the rear face of the disc. Twigs or branch stems are not easily cut by the knives and simply stay on the front face of the disc or sometimes progress to the back face of the disc either by passing through the chip slot or around the periphery of the disc and are thrown out the chipper spout mixed with the cut chips. No simple and efficient way of separating these twigs and branch stems and generally debris associated with chipping whole trees has been devised to date.

It has been proposed to divide the chipper housing into two compartments one of which is an involute and forms a fan to provide more air for conveying the chips as taught, for example, in Canadian Pat. No. 754,372 issued Mar. 14, 1967 to Eklund, however, this device does not separate debris from chips.

It has also been proposed to separate dirt and loose bark in a drum chipper designed to chip short length large diameter logs. In this chipper the short log lengths are fed radially (the longitudinal axis of the log and drum are aligned) and the knives cut substantially parallel to the grain to form chips which pass into the drum. This device is unsuitable for whole tree chipping.

BRIEF DESCRIPTION OF THE INVENTION

It is the object of the present invention to provide a chipper wherein chips and debris may be separated.

Broadly the present invention relates to a debris separating chipper comprising a housing, a chipper disc mounted for rotation in said housing, a substantially radial cutting face on said rotor, at least one knife on said cutting face, a front chamber having one wall formed by said cutting face, a slot through said face adjacent each said knife, each said slot permitting chips cut by its adjacent said knife to pass through said face away from said front chamber and into a space separated from said front chamber, means for feeding wood longitudinally against said cutting face, a first chipper outlet for removal of debris from the front chamber and a second chipper outlet for removal of chips from said space.

BRIEF DESCRIPTION OF THE DRAWINGS

Further features, objects and advantages will be evident from the following detailed description from the preferred embodiments of the present invention taken in conjunction with the accompanying drawings in which:

FIG. 1 is a schematic section along the lines 1—1 of FIG. 2.

FIG. 2 is a schematic section along the lines 2—2 of FIG. 1.

FIG. 3 is a view similar to FIG. 2 but illustrating a modification of the present invention.

FIG. 4 is a schematic front view with parts omitted for clarity of the FIG. 3 modification of the present invention.

FIG. 5 is a section along the line 5—5 of FIG. 4.

DESCRIPTION OF THE PREFERRED EMBODIMENT

As seen in FIGS. 1 and 2 the chipper 10 is formed by a housing 12 having a front wall 14, a rear wall 16 and a circumferential wall 18 enclosing a chipper disc 20 which is mounted to rotate with a driven shaft 22. The disc 20 is provided with slots 23 immediately followed by cutting knives schematically illustrated at 24 on the substantially radial front cutting face 25 of the disc 20. Paddles 26 are mounted on rear face 28 adjacent the periphery of disc 20. A suitable wood feed inlet into the housing 12 is indicated at 30. The wood is advanced substantially axially (along its longitudinal axis) into the chipper.

The chipper is divided by the disc 20 and in the illustrated arrangement by a annular partition 32, into a rear chamber 34 which receives the chips that pass through slots 23 preceding each of the knives 24 and a front chamber 36 which receives the small parts of the tree that are not chipped and can fit between the disc 20 and the adjacent end of the infeed spout 30, i.e. leaves, twigs, branches, etc. (debris) which are not cut and forced to pass through the slots 23 to the rear chamber 34. Separate outlets 38 and 40 are provided from the respective chambers 34 and 36.

Suitable paddles schematically illustrated at 42 are preferably provided on the front face of the disc 20 adjacent the periphery thereof to ensure that the front chamber 36 remains clear.

The embodiment of FIGS. 1 and 2 operates as follows:

Whole trees including the bole and top section with branches thereon to be chipped are fed substantially axially via the inlet or feed spout 30 against the front face of the disc 20 and are cut by the knives 24. The chips so produced pass through slots 23 into the rear chamber 34 and are swept therefrom via the paddles 26. Twigs, leaves, etc. (debris) that do not pass through the disc 20 are pushed or pulled into the front chamber 36 as or after they are severed from the tree by the knife 24. This debris which enters the front chamber 36 is moved along the face 25 of the disc 20 by centrifugal force and is swept out of the chamber 36 via the paddles or the like 42 through debris outlet 40.

It will be noted that in FIG. 1 separate outlets 38 and 40 for the chips and twigs etc. (debris) respectively are shown exiting along the same tangential path but as indicated by the dotted lines at 44 in FIG. 1 outlet 40 may be in any circumferential position relative to the outlet 38.

The embodiments illustrated in FIGS. 3 to 5 differ from those illustrated in FIGS. 1 and 2 in several ways and some of the modifications shown in FIG. 3 may equally well be applied to the FIGS. 1 and 2. For example, the partition 32 of the embodiment of FIGS. 1 and 2 is formed by an annular flange projecting inwardly from the periphery 18 of the chamber or housing 12 whereas in FIG. 3 this flange 32 has been replaced by a circular flange 46 projecting in from the front wall 14 of the housing. Alternatively the flanges 32 and 46 may be eliminated and the chipper housing be divided by the disc per se, i.e. the clearance between the periphery of the disc 20 and, the periphery 18 of the housing 12 would be sufficiently small for the disc 20 alone to effectively divide the housing into the front chamber 36 of the rear chamber 34. A proven way to construct the partition is to form a labyrinth type seal for example by forming a grove in the periphery of the disc and extend the annular partition 32 into the grove.

A further modification is shown in FIGS. 3 to 5 inclusive in that instead of the debris outlet 40 extending tangentially from the housing 12 through the circumferential wall 18 the debris outlet 50 has been provided by a hole 52 through the front wall 14. It will be noted from FIG. 5 that the annular flange or ring 46 is omitted in the area of the outlet 50 and that a separate baffle 54 is provided to direct to the debris at an angle outward from the front chamber 36.

The embodiment of FIGS. 3 to 5 inclusive operates in the same way as the embodiment of FIGS. 1 and 2 in that wood is fed into the front of the chipper via inlet 30, is chipped by the knives 24 with the chips passing through the disc 20 into the rear chamber 34 and the debris being drawn into the front chamber 36 and being carried out through the outlet 50 by being deflected via the baffle 54. The chips leave the rear chamber 34 in the conventional manner through outlet 38.

The disclosure has dealt primarily with chippers having tangential chip outlets from the housing however, the invention may equally be applied to disc chippers with bottom chip outlets provided these chippers are formed with rear and front chambers and with separate outlets from these chambers for the chips and debris.

As is known, the wood material in the branches and twigs has markedly inferior quality for pulping than the bole section. Also the quantity of bark and leaves or ratio of bark and leaves to wood in small branches or twigs is very high compared with the remainder of the tree and further the majority of grit and dirt gathered during the tree harvesting operations adheres to the branches. It is therefore desirable for pulping operations to minimize the number of branches or twigs that are cut into chips and to maximize the amount of such material (branches and twigs) that leave the chipper via the debris outlet. To this end, it has been found that by increasing the anvil clearance (clearance between the anvil and the knife) significantly the number of twigs and branches drawn into the front chamber is significantly increased. For example conventionally an anvil clearance of about 0.015 to about 0.04 inches is used, however to increase the number of twigs and branches in the debris this clearance may desirably be increased to about 0.1 inches but in some case may be increased even more up to about 0.3 inches.

Increasing the anvil clearance as above described facilitates passage of the branches, after or as they are cut from the tree, into the front chamber and thus reduces the number of branches which are cut into chips. Twigs or branches once they are severed from the tree but without being chopped, pass into the front chamber through a passage defined by the clearance between the cutting face and the adjacent end of the infeed spout i.e. not all of these unchipped branches and twigs need pass through the anvil clearance which defines only one side of the passage from the infeed spout to the front chamber. Some may pass through the clearance between the bottom edge of the infeed spout and the cutting face since such clearance may be substantially greater than the anvil clearance. Whatever way the twigs and branches enter the front chamber, if they are of a longitudinal dimension greater than any of these clearances they must be moved or positioned substantially parallel to the cutting face of the disc. This operation may be obtained by the pulling action of the knives as they penetrate only partly through the branch as determined by the clearance between the knife and the anvil. In any event, it is apparent that they must deviate from the direction in which they are advanced into the chipper and at least partly align or orient themselves with the face of the chipper disc to permit them to pass from the infeed spout into the front chamber.

The distance between the front cutting face 25 of the disc and the inner face of the front wall of the housing should be at least 1 inch to provide an adequate size front chamber for reasonable operation. Generally this dimension will not be greater than about 3 inches since increasing the dimension beyond 3 inches does not provide any additional advantages.

The disclosure has referred to whole tree chipping which is intended to include not only whole trees, but also discrete tree sections such as tops only but with branches and twigs integral therewith.

Whole tree chippers with substantially flat or radial cutting faces have been described, however, the invention may also be applied to modified disc type chippers such as the so called V-drum whole tree chippers, but the radial disc has proved more effective.

Modifications may be made without departing from the spirit of the invention as defined in the appended claims.

I claim:

1. A whole tree chipper for chipping wood and separating debris from cut chips comprising: a housing having a front wall, a rear wall and a circumferential wall extending between the front and rear walls, a chipper disc mounted for rotation in said housing, said disc having a radial cutting face, an enclosed front chamber in said housing, said front chamber being defined by said cutting face, said front wall and a portion of said circumferential wall generally extending between the front wall and the disc, at least one knife on said cutting face, a slot through said cutting face adjacent said knife for directing chips cut by said knife through said cutting face to a space behind the front chamber which is separated from said front chamber, a feed inlet through said front wall and said front chamber to direct wood substantially along its longitudinal direction against said cutting face, a first tangential chipper outlet through said circumferential wall from said front chamber, paddle means on said disc adjacent said circumferential wall in said front chamber, said paddle means ejecting debris from said front chamber through said first tangential outlet thereby to convey said debris away from said chipper, a second tangential chipper outlet extending from said space through said circumferential wall, means on said disc for ejecting chips from said space through said second tangential outlet away from said chipper.

2. A chipper as defined in claim 1 wherein said slot provides substantially the sole communication for said chips between said front chamber and said space.

3. A chipper as defined in claim 2 wherein said space comprises a chip chamber.

4. A chipper as defined in claim 3 wherein an annular flange projects in from the periphery of said housing towards the periphery of said disc to form a partition in the said housing separating said front chamber from said chip chamber.

5. A chipper as defined in claim 4, wherein the minimum width of said front chamber defined by the distance between said cutting face and said front wall is at least 1 inch.

6. A chipper as defined in claim 1, wherein the minimum width of said front chamber defined by the distance between said cutting face and said front wall is at least 1 inch.

7. A whole tree chipper for separating debris from chips comprising: a housing having a front wall, a back wall and a peripheral wall, a chipper disc mounted for rotation in said housing and dividing said housing into an enclosed front chamber and an enclosed chip chamber, said disc having a substantially radial cutting face facing said front chamber and forming one wall of said front chamber, the other walls of said front chamber being formed by said front wall and a portion of said peripheral wall of said housing, generally extending between said front wall and said disc, an inlet through said front wall through which wood may be fed against said cutting face by advancing said wood substantially on its longitudinal direction, at least one knife on said cutting face and a slot through said disc adjacent said knife for directing chips cut by said knife through said disc into said chip chamber, a tangential debris outlet from said front chamber through said peripheral wall for removal of debris from said front chamber, paddle means on said disc adjacent said peripheral wall in said front chamber, said paddle means ejecting debris from said front chamber through said tangential debris outlet thereby to convey said debris away from said chipper, and a tangential chip outlet from said chip chamber extending through said peripheral wall, means on said disc for ejecting chips from said chip chamber through said tangential chip outlet away from said chipper, said slots providing substantially the sole communication for said chips between said front and said chip chambers.

8. A chipper as defined in claim 7 wherein an annular flange projects from the periphery of said housing towards the periphery of said disc to form a partition in the said housing between said front and chip chambers.

9. A chipper as defined in claim 8, wherein the minimum width of said front chamber defined by the distance between said cutting face and said front wall is at least 1 inch.

10. A chipper as defined in claim 7, wherein the minimum width of said front chamber defined by the distance between said cutting face and said front wall is at least 1 inch.

* * * * *